United States Patent
Lidgren et al.

(10) Patent No.: US 9,414,187 B2
(45) Date of Patent: Aug. 9, 2016

(54) METHOD, LOCATION DETERMINER, COMPUTER PROGRAM AND COMPUTER PROGRAM PRODUCT FOR DETERMINING A LOCATION OF A MOBILE COMMUNICATION TERMINAL

(71) Applicant: GWS PRODUCTION AB, Lund (SE)

(72) Inventors: Lars Lidgren, Lund (SE); Andreas Rodman, Barseback (SE)

(73) Assignee: GWS PRODUCTION AB, Lund (SE)

( * ) Notice: Subject to any disclaimer, the term of this patent is extended or adjusted under 35 U.S.C. 154(b) by 0 days.

(21) Appl. No.: 14/439,741

(22) PCT Filed: Nov. 4, 2013

(86) PCT No.: PCT/EP2013/072907
§ 371 (c)(1),
(2) Date: Apr. 30, 2015

(87) PCT Pub. No.: WO2014/068103
PCT Pub. Date: May 8, 2014

(65) Prior Publication Data
US 2015/0365788 A1 Dec. 17, 2015

(30) Foreign Application Priority Data
Nov. 5, 2012 (SE) ...................................... 1251248

(51) Int. Cl.
*H04W 24/00* (2009.01)
*H04W 4/02* (2009.01)
(Continued)

(52) U.S. Cl.
CPC ................. *H04W 4/02* (2013.01); *H04L 67/18* (2013.01); *H04W 4/14* (2013.01); *H04W 64/00* (2013.01); *H04W 88/02* (2013.01)

(58) Field of Classification Search
CPC .. H04W 64/00; H04W 4/02; H04L 29/08657; H04M 1/72572
USPC .......................... 455/456.1, 456.5, 456.6, 457
See application file for complete search history.

(56) References Cited

U.S. PATENT DOCUMENTS

2003/0148771 A1    8/2003   De Verteuil
2008/0167018 A1    7/2008   Havlark et al.
(Continued)

FOREIGN PATENT DOCUMENTS

WO    WO2008/020789 A1    2/2008
WO    WO2009/018534 A1    2/2009

OTHER PUBLICATIONS

International Search Report and Written Opinion prepared by the European Patent Office on Mar. 20, 2014, for International Application No. PCT/EP2013/072907.
(Continued)

*Primary Examiner* — Danh Le
(74) *Attorney, Agent, or Firm* — Sheridan Ross P.C.

(57) ABSTRACT

It is presented a method for determining a location of a mobile communication terminal. The method is performed in a location determiner and comprises the steps of: obtaining, using a first location source, a first location indicator of the mobile communication terminal; obtaining using a second location source, a second location indicator of the mobile communication terminal; determining an inconsistency condition to be true when one, and only one, of the first and second location indicators indicates the mobile communication terminal to be located within the coverage of its home network; and when the inconsistency condition is true, disregarding the location indicator indicating the mobile communication terminal to be located within the coverage of its home network.

18 Claims, 3 Drawing Sheets

(51) Int. Cl.
   *H04W 4/14*    (2009.01)
   *H04W 64/00*   (2009.01)
   *H04L 29/08*   (2006.01)
   *H04W 88/02*   (2009.01)

(56) References Cited

U.S. PATENT DOCUMENTS

| | | | | |
|---|---|---|---|---|
| 2009/0061854 | A1* | 3/2009 | Gillot | H04W 24/00 455/432.1 |
| 2009/0131038 | A1* | 5/2009 | MacNaughtan | H04W 24/02 455/422.1 |
| 2009/0264131 | A1* | 10/2009 | Wu | H04W 36/0005 455/436 |
| 2010/0309051 | A1* | 12/2010 | Moshfeghi | G01S 5/0236 342/378 |
| 2011/0250903 | A1* | 10/2011 | Huang | G01S 5/0263 455/456.1 |
| 2012/0015655 | A1* | 1/2012 | Lee | H04W 8/02 455/435.1 |
| 2012/0134353 | A1* | 5/2012 | Streed | H04W 56/0085 370/350 |
| 2013/0106987 | A1* | 5/2013 | Wang | H04L 12/1818 348/14.08 |

OTHER PUBLICATIONS

International Preliminary Report on Patentability prepared by the European Patent Office on Sep. 4, 2014, for International Application No. PCT/EP2013/072907.

* cited by examiner

Fig. 6 ically the case when a subscriber is roaming, such as during international travel. It is thus desired to find a way to increase reliability when determining the location of a mobile communication terminal.

METHOD, LOCATION DETERMINER, COMPUTER PROGRAM AND COMPUTER PROGRAM PRODUCT FOR DETERMINING A LOCATION OF A MOBILE COMMUNICATION TERMINAL

CROSS REFERENCE TO RELATED APPLICATIONS

This application is a national stage application under 35 U.S.C. 371 and claims the benefit of PCT Application No. PCT/EP2013/072907 having an international filing date of Nov. 4, 2013, which designated the United States, which PCT application claimed the benefit of Swedish Patent Application No. 1251248-9 filed Nov. 5, 2012, the disclosures of each of which are incorporated herein by reference.

TECHNICAL FIELD

The invention relates to determining a location of a mobile communication terminal.

BACKGROUND

Mobile communication terminals, such as mobile phones, have reached a great market penetration in the last couple of decades. These days, at least in the western world, a large majority of adult people have access to their own mobile communication terminal.

For various reasons, it is sometimes desired to obtain the location of a mobile communication terminal. It is known to locate mobile communication terminals using network based methods, such as using attached network etc., terminal based methods, such as using cell id, global positioning system GPS, or even manual methods, where the user inputs a current location into a location determination system.

However, some of these location methods are sometimes not accurate. This is particularly the case when a subscriber is roaming, such as during international travel. It is thus desired to find a way to increase reliability when determining the location of a mobile communication terminal.

SUMMARY

According to a first aspect, it is presented a method for determining a location of a mobile communication terminal. The method is performed in a location determiner and comprises the steps of: obtaining, using a first location source, a first location indicator of the mobile communication terminal; obtaining, using a second location source, a second location indicator of the mobile communication terminal; determining an inconsistency condition to be true when one, and only one, of the first and second location indicators indicates the mobile communication terminal to be located within the coverage of its home network; and when the inconsistency condition is true, disregarding the location indicator indicating the mobile communication terminal to be located within the coverage of its home network.

The step of obtaining a first location indicator may comprise: obtaining, from the first location source utilising a mobile subscriber database, a current network of a mobile subscriber; and deriving the first location indicator using the current network.

The step of obtaining a first location indicator may comprise: obtaining, from the first location source, SMS (Short Message Service) routing information indicating a current network of a mobile subscriber; and deriving the first location indicator using the current network. The SMS routing information can e.g. comprise a network node number referring to a network node for routing SMS messages. The reference to the network node number comprises a country code prefix which can be used to derive the first location, thus being the country indicated by the country code prefix.

In the step of obtaining a second location indicator, the second location source may be a location source selected from the group consisting of: Global Positioning System, GLONASS, Galileo, Beidou, Compass, Wi-Fi access point mapping, radio base station data, radio base station identity, and travel booking tracking.

The step of obtaining a second location indicator may comprise: obtaining, from the second location source utilising a mobile subscriber database, a current network of a mobile subscriber; and deriving the second location indicator using the current network.

The step of obtaining a second location indicator may comprise: obtaining, from the second location source, SMS routing information indicating a current network of a mobile subscriber; and deriving the second location indicator using the current network. The reference to the network node number comprises a country code prefix which can be used to derive the second location, thus being the country indicated by the country code prefix.

The method may further comprise the step of: when the inconsistency condition is true, storing for the mobile communication terminal, in a location database, a location based on the location indicator indicating the mobile communication terminal to be located away from the coverage of its home network.

The method may further comprise the step of: when the inconsistency condition is true, storing a discrepancy indicator for the mobile communication terminal in the location database.

The method may be repeated and may further comprise the step of: when the first location indicator is consistent with the second location indicator and there is a discrepancy indicator stored for the mobile subscriber, removing the discrepancy indicator for the mobile subscriber in the location database.

The method may further comprise the step of: when there is a discrepancy indicator stored for the mobile subscriber, avoiding sending messages via a message service associated with the location source indicating the mobile communication terminal to be located within the coverage of its home network.

The method may further comprise the step of: when the inconsistency condition is true, avoiding sending messages via a message service associated with the location source indicating the mobile communication terminal to be located within the coverage of its home network.

The method may be repeated, and the step of obtaining the second location indicator may optionally only be performed for a minority of iterations.

The method may further comprise the step of: storing operator data when it is determined that an operator operates a cellular communication network with an identical network identifier in more than one country.

According to a second aspect, it is presented a location determiner for determining a location of a mobile communication terminal. The location determiner comprises: a processor; and a computer program product. The computer program product stores instructions that, when executed by the processor, causes the location determiner to: obtain, using a first location source, a first location indicator of the mobile communication terminal; obtain, using a second location source, a second location indicator of the mobile communication terminal; determine an inconsistency condition to be true when one, and only one, of the first and second location indicators indicates the mobile communication terminal to be located within the coverage of its home network; and when the inconsistency condition is true, disregard the location indicator indicating the mobile communication terminal to be located within the coverage of its home network.

The instructions to obtain a first location indicator may comprise instructions to: obtain, from the first location source utilising a mobile subscriber database, a current network of a mobile subscriber; and derive the first location indicator using the current network.

The second location source may be a location source selected from the group consisting of: Global Positioning System, GLONASS, Galileo, Beidou, Compass, Wi-Fi access point mapping, radio base station data, radio base station identity, and travel booking tracking.

The instructions to obtain a second location indicator may comprise instructions to: obtain, from the second location source utilising a mobile subscriber database, a current network of a mobile subscriber; and derive the second location indicator using the current network.

The computer program product may further comprise instructions to: when the inconsistency condition is true, store for the mobile communication terminal, in a location database, a location based on the location indicator indicating the mobile communication terminal to be located away from the coverage of its home network.

The computer program product may further comprise instructions to: when the inconsistency condition is true, store a discrepancy indicator for the mobile communication terminal in the location database.

The instructions may be repeated; and the computer program product may further comprise instructions to: when the first location indicator is consistent with the second location indicator and there is a discrepancy indicator stored for the mobile subscriber, remove the discrepancy indicator for the mobile subscriber in the location database.

The computer program product may further comprise instructions to: avoid sending messages via a message service associated with the location source indicating the mobile communication terminal to be located within the coverage of its home network when there is a discrepancy indicator stored for the mobile subscriber.

The computer program product may further comprise instructions to: avoid sending messages via a message service associated with the location source indicating the mobile communication terminal to be located within the coverage of its home network when the inconsistency indicator is true.

The instructions may be repeated and the instructions to obtain the second location indicator may optionally only be performed for a minority of iterations.

The location determiner may further comprise instructions to store operator data when it is determined that an operator operates a cellular communication network with an identical network identifier in more than one country.

According to a third aspect, it is presented a computer program for determining a location of a mobile communication terminal, The computer program comprises computer program code which, when run on a location determiner, causes the location determiner to: obtain, using a first location source, a first location indicator of the mobile communication terminal; obtain, using a second location source, a second location indicator of the mobile communication terminal; determine an inconsistency condition to be true when one, and only one, of the first and second location indicators indicates the mobile communication terminal to be located within the coverage of its home network; and when the inconsistency condition is true, disregard the location indicator indicating the mobile communication terminal to be located within the coverage of its home network.

According to a fourth aspect, it is presented a computer program product comprising a computer program according to the third aspect and a computer readable means on which the computer program is stored.

It is to be noted that any feature of any aspect may, where possible, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
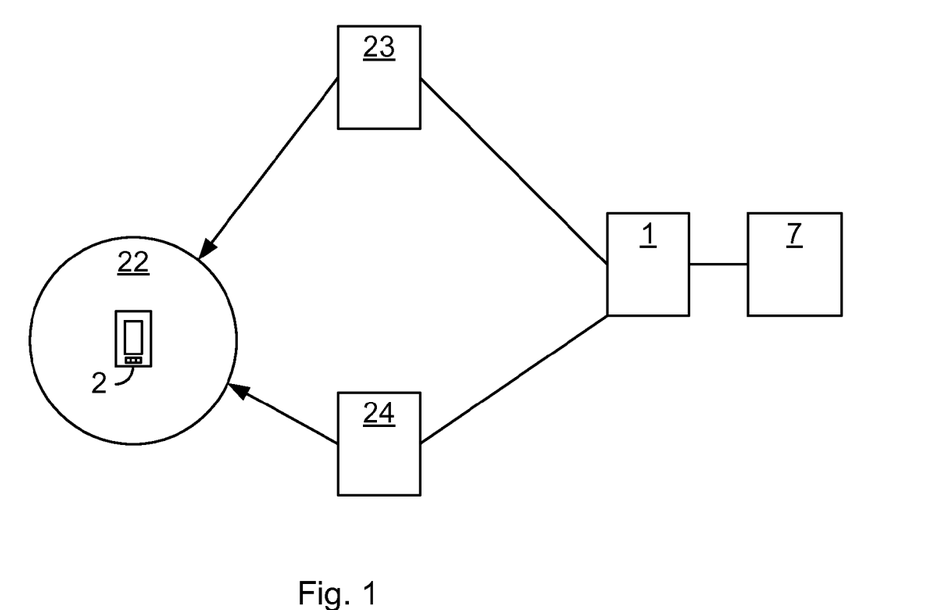
FIG. 1 is a schematic drawing illustrating an environment where embodiments presented herein can be applied.

FIG. 1 is a schematic drawing illustrating an environment where embodiments presented herein can be applied. A location determiner 1 is connected to a first location source 23 and a second location source 24 using a suitable connection, e.g. via a wide area network such as the Internet. The location determiner 1 can e.g. be a server which can optionally provide other services than providing a location.

In this example, both the first location source 23 and the second location source 24 utilise mobile subscriber databases, and thus have the ability to point to what cellular communication network a particular subscriber is connected to. For example, the first location source 23 and the second location source 24 can, for a particular mobile subscriber, query the mobile subscriber database of the home network of the particular mobile subscriber. The cellular communication network can be mapped to a specific country, giving an indication of the country in which a particular mobile subscriber is located.

The cellular communication networks may comply with any current or future mobile communication standard, e.g. any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), as long as the principles described hereinafter are applicable.

A location requester 7 is an entity requesting the location of the mobile communication terminal 2. For example the location requester 7 can be a security alert system. The security alert system delivers real time information and advice about nearby threats to individuals. The security alert system can be organised around a central location with receives continuous incoming data from credible sources such as selected early warning sources, scientific institutes, news agencies, official agencies, and individual informers about potentially threatening events. Once the information is processed, a message (such as a text message, multimedia message, e-mail, or message via an application running on the mobile communication terminal) is developed and sent to those subscribers of the security alert system which are likely to be affected by the identified threat.

In such an example, the granularity of the location determination of the mobile communication terminal 2 can be quite large and still be of great use. For instance, in many cases it may be sufficient to know that the mobile communication terminal 2 is in a specific country, which can be indicated by the coverage area 22 of a cellular communication network. Even if it is better with a location determination with more detailed granularity, the security alert system can e.g. send alerts to subscribers in a particular country if a security threat occurs in the country in question. Subscribers in the security alert system are mapped to mobile communication terminals, e.g. via phone numbers or IMSI (International Mobile Subscriber Identity). The phone number comprises a country prefix code indicating the country of operator to which the subscriber is connected to. The IMSI also comprises a country prefix code (different code than for a regular phone number) indicating the country of the operator.

In the scenario shown in FIG. 1, a mobile communication terminal 2 is within a first coverage area 22 of a particular cellular communication network. The term mobile communication terminal is also known as wireless terminal, user equipment, mobile terminal, user terminal, user agent, etc., and can be, for example, what today are commonly known as a mobile phone or a tablet/laptop with wireless connectivity or fixed mounted terminal. Additionally, the term mobile communication terminal, as used in the claims and description herein, also encompasses any subscriber entity used by the terminal and is thus identifiable using a subscriber identifier, such as IMSI or phone number. While only one mobile communication terminal 2 is shown here, any number of mobile communication terminals can be present, and may each be treated in the manner described herein.

In this example, the location determiner 1 obtains location indicators from each one of the first and second location sources 23, 24. Both the first location source 23 and the second location source 24 point, correctly, to the first coverage area 22, of the cellular communication network which the mobile communication terminal is connected to. Consequently, the two location sources 23 and 24 are consistent with each other.

Figure 2:
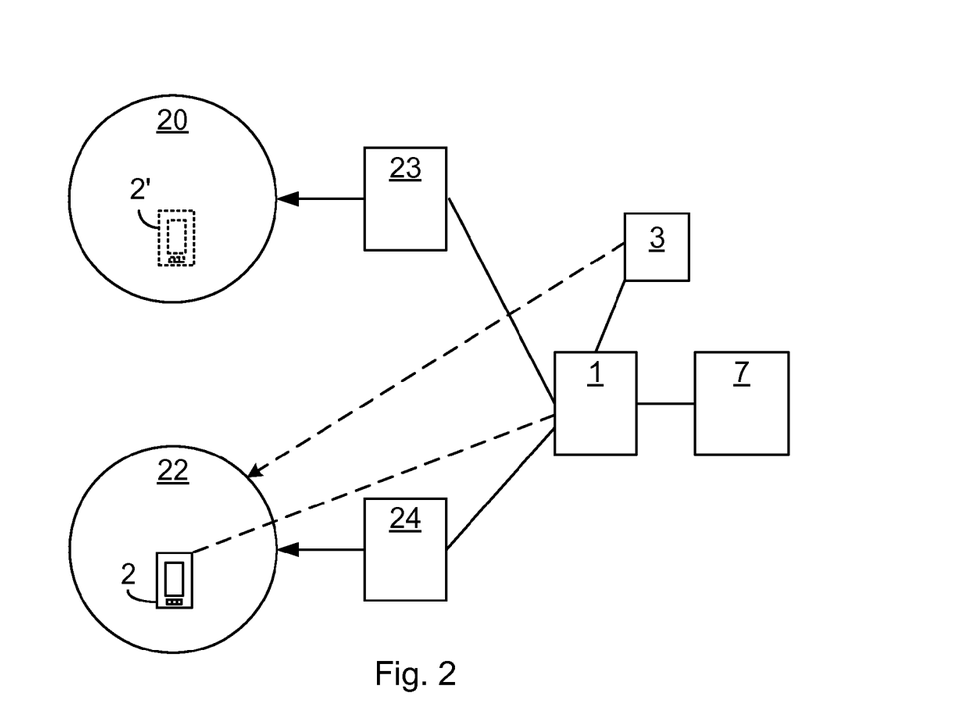
FIG. 2 is a schematic drawing illustrating an environment where embodiments presented herein can be applied.

FIG. 2 is a schematic drawing illustrating an environment where embodiments presented herein can be applied. Just like in the example shown in FIG. 1, the mobile communication terminal is located in the first coverage area 22.

Here however, the first location source 23 incorrectly reports to the location determiner 1 that the location of the mobile communication terminal 2' is within a second first coverage area 20, corresponding to a home cellular communication network of the mobile communication terminal 2. The second location source 24, however, correctly reports that the mobile communication terminal 2 is within the first coverage area 20.

In this inconsistent location reporting situation, according to embodiments presented herein, the location determiner then disregards the location data indicating that the mobile communication terminal is within the coverage of its home network, i.e. the first location source 23 in this case, and determines the second location source 24 to be valid.

Optionally, the second location source can be a location source within the mobile communication terminal 2 itself, such as a location determiner using any one or more of the following systems: Global Positioning System (GPS), GLONASS, Galileo, Beidou, Compass, Wi-Fi access point mapping, radio base station data, and radio base station identity. The radio base station data can e.g. be data such as what network the radio base station belongs to. In such a situation, the mobile communication terminal 2 may not even need to attach to the network to obtain this data.

Optionally, the second location source can be a separate location source 3 not related with a mobile communication network. For example, the location source 3 can be a travel booking tracking server, where travel bookings of the subscriber using the mobile communication terminal 2 are stored. In this way, the separate location source can e.g. point to a particular country, which may, or may not, be consistent with the first location source depending on the situation.

If there are more location sources which point to the first coverage area 22, this confirms the determination to disregard the first location source (being part of the home network).

Figure 3:
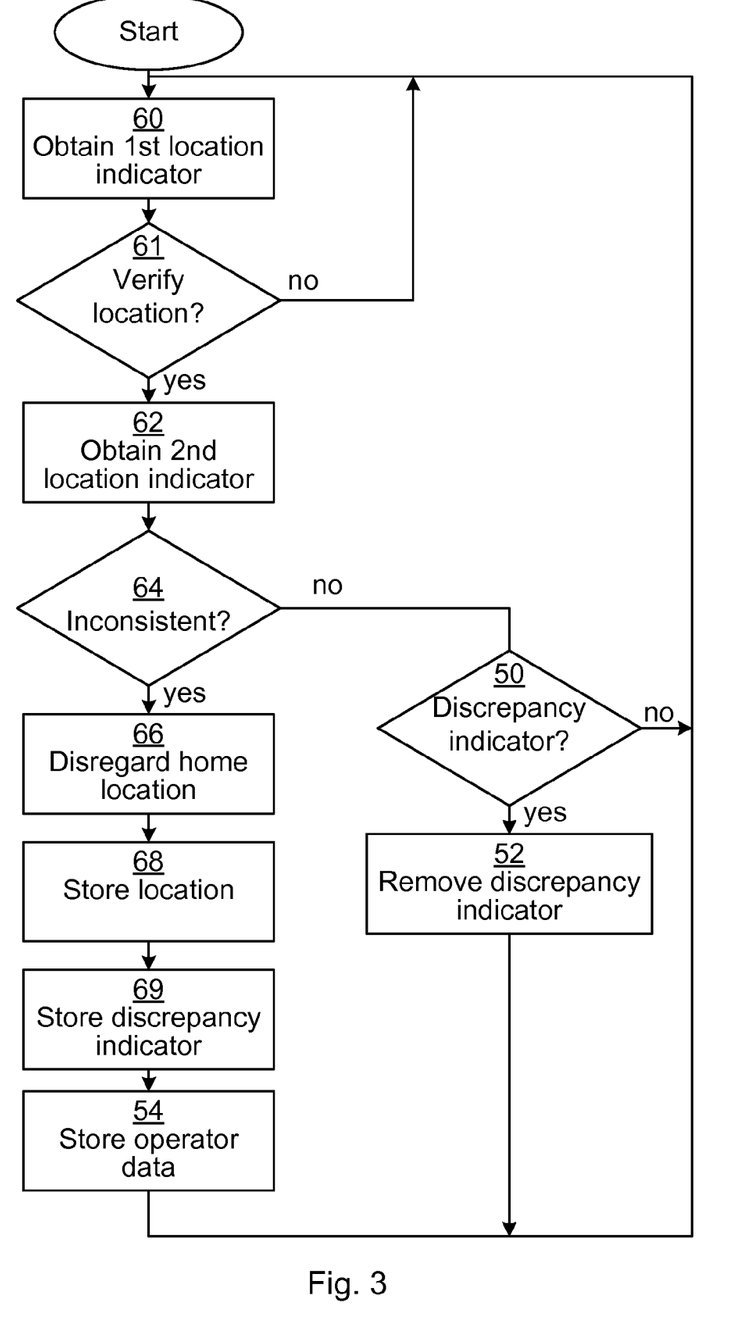
FIG. 3 is a flow chart illustrating a method according to one embodiment, performed in the location determiner of FIGS. 1 and 2.

FIG. 3 is a flow chart illustrating a method according to one embodiment. The method is performed in the location determiner 1 of FIGS. 1 and 2. The method is performed for one mobile communication terminal and may be performed in parallel for a plurality of communication terminals.

In an initial obtain first location indicator step 60, a first location indicator of the mobile communication terminal is obtained using a first location source.

In one embodiment, the first location indicator is a current network of a mobile subscriber. In this case, the first location source utilises a mobile subscriber database. The first location indicator is then derived using the current network, e.g. using a mapping between network identity and country. The current network can be obtained by requesting routing information for an SMS (Short Messaging Service) message from a first operator being the first location source. SMS is also known as text message. The first operator can be any operator in any country being able to provide SMS routing information, and is not limited to e.g. the home operator of the mobile communication terminal. The response from the first operator to the location determiner comprises a reference to a network node number. The network node number is a reference to a network node which allows routing of messages, such as SMS messages, e.g. via an SMSC (SMS Centre). The reference to the network node number also comprises a country prefix code. In such a case, the first location indicator is the network node number or the network of the network node number.

The SMS routing information can be derived by send a SS7 (Signalling System No. 7) call MAP_SEND_ROUTING_INFO_FOR_SM to the home operator which returns a network node number. The first location indicator (and second location indicator described below) may also be obtained by directly accessing a HLR (Home Location Register) or a sub-system, such as a node which is responsible for transmitting price information to roaming subscribers attaching to the network. It may be less of a security risk for the operator to provide access to a sub-system than to the HLR, whereby it may be more likely for a third party (such as the party operating the location determiner) to gain access to the sub-system. This is made possible by integration with each operator that shall be supported, compared to the MAP_SEND_ROUTING_INFO_FOR_SM request which can be sent to any external operator.

In one embodiment, the first location source is a location source selected from the group consisting of: Global Positioning System, GLONASS, Galileo, Beidou, Compass, Wi-Fi access point mapping, radio base station data, radio base station identity, and travel booking tracking.

In a conditional verify location step 61, it is determined whether the location needs to be verified. For example, if the first location source is a satellite based location source, such as GPS, this is considered reliable and there is no need to verify the location. In another scenario, the first location source utilises a mobile subscriber database indicating the mobile subscriber to be in the home network. When the location indicator is derived from a network node number reference, the country prefix code of the phone number can be compared with the country prefix code of the network node number. When these are the same (or at least refer to the same country), this indicates that the mobile subscriber is in the home network.

Since it has been found that mobile subscriber databases, and mobile subscriber databases pointing to the mobile subscriber being in its home network in particular, are sometimes unreliable, e.g. due to home routing, the location can in this case need to be verified. Home routing is when a mobile subscriber database indicates that a mobile communication terminal is attached to the home network, even if the mobile communication terminal is roaming. This can for instance occur when the mobile subscriber database is asked for the network of a mobile communication terminal for sending a text message, i.e. requesting SMS routing information. For routing text messages, this usually does not pose any significant issue, but when the network of the mobile communication terminal is used for location determination, this home routing incorrectly indicates that the mobile communication terminal is attached to its home network when, in fact, it is roaming.

Home routing also degrades the quality of the message delivery report that indicates when a receiving mobile communication terminal has received a message, such as a text message (using SMS) or a multimedia message (using MMS, Multimedia Message Service). When a mobile subscriber is home routed, messages are not sent directly to the actual network where the subscriber is (e.g. 22 of FIG. 2), but to the home network (e.g. 20 in FIG. 2) which then, in turn, routes the message to the receiving network. In some cases, the home network will send false positive delivery reports indicating that the mobile communication terminal has received the message when it has actually been discarded by the home operator. The reason for home network discarding messages can be that messages are believed to be advertising or spam. Detection that a mobile operator connection is home routed while another is not can be crucial in order to select the connection to an operator which does not result in home routing, to thereby ensure that a critical message is received by the communication terminal. This can be particularly useful in a security alert system as explained above especially as mass warning messages have similar traffic structure as mass advertising spam and can therefore be classified as spam by the home routing spam filters.

In one embodiment, when the first location source points to a home network, it is determined to verify the location once every n times (where n is a number) or periodically with a period t (where t is a time duration).

In one embodiment, when there is a discrepancy indicator stored for the mobile communication terminal (see the store discrepancy indicator step 68 below), and also the first location source indicates the mobile communication terminal to be in its home network, this is a reason to verify the location.

In one embodiment, there is a reason to verify when the first location source is a particular server which has been known to be used only, or primarily, for home routing.

In one embodiment, there is a reason to verify the location when a location source indicates that the mobile communication terminal is in its home network after a period of it having been roaming. This can be one indicator home routing occurring.

In one embodiment, when a reliable source, such as GPS, has indicated that the mobile communication terminal is at an airport, location verification is triggered, e.g. for a period of x hours and/or until an accurate source indicates that the mobile communication terminal is no longer at the airport.

Optionally, two or more of the factors described above can be combined, e.g. with different weights to determine when the location needs to be verified.

Some network node numbers may of the type that they are never (as far as is known) home routed for mobile subscribers belonging to that network. This may be indicated in a database, where an indication of "never home routing" is associated with the network node numbers in question. Hence, if the first location source indicator is associated with a network number which is never home routed, the location does not need to be verified.

If it is determined that the location needs to be verified, the method continues to an obtain second location indicator step 62. Otherwise, the method returns, optionally after some delay, to the obtain first location indicator step 60.

In the obtain second location indicator step 62, a second location indicator of the mobile communication terminal is obtained using a second location source.

In one embodiment, the second location source is a location source selected from the group consisting of: Global Positioning System, GLONASS, Galileo, Beidou, Compass, Wi-Fi access point mapping, radio base station data, radio base station identity, and travel booking tracking.

In one embodiment, the second location indicator is a current network of a mobile subscriber. In this case, the second location source is a mobile subscriber database. The second location indicator is then derived using the current network, e.g. using a mapping between network identity and country. The current network can be obtained by requesting routing information for an SMS message from a second operator being the second location source. The second operator can be any operator in any country being able to provide SMS routing information, and is not limited to e.g. the home operator of the mobile communication terminal. The response from the second operator to the location determiner comprises a reference to a network node number. The reference to the network node number also comprises a country prefix. In such a case, the second location indicator is the network node number reference or the network of the network node number.

The SMS routing information can be derived by send a SS7 (Signalling System No. 7) call MAP_SEND_ROUTING_INFO_FOR_SM to the home operator which returns a network node number.

The first location indicator (and second location indicator described below) may also be obtained by directly accessing a HLR or a sub-system, such as a node which is responsible for transmitting price information to roaming subscribers attaching to the network. As explained above, it may be less of a security risk for the operator to provide access to a sub-system than to the HLR, whereby it may be more likely for a third party (such as the party operating the location determiner) to gain access to the sub-system. This is made possible by integration with each operator that shall be supported, compared to the MAP_SEND_ROUTING_INFO_FOR_SM request which can be sent to any external operator.

It is to be noted that the first and second location sources may, but do not need to, be of the same type.

Optionally, the method also comprises steps to obtain a third location indicator or even more location indicators.

In the conditional inconsistent step 64 an inconsistency condition is determined to be true when one, and only one, of the first and second (and third, etc. when present) location indicators indicates the mobile communication terminal to be located within the coverage of its home network. In other words, one of the two location sources is a mobile subscriber database and indicates that the mobile communication terminal is in its home network, while the other location source indicates that the mobile communication terminal is out of its home network. The other location source can also be a mobile subscriber database, but could equally well be another type of location source. The home network can e.g. be indicated by the network node number referred to in the first or second location indicators.

Inconsistency can also optionally be determined by a database of network node numbers. Some network node numbers are always home routed for mobile subscribers belonging to that same network, implying that these network node numbers can be ignored and always be seen as an inconsistent indicator.

If the inconsistency condition is true, the method continues to a disregard home location step 66. Otherwise, the method continues to a conditional discrepancy indicator step 50.

In the disregard home location step 66, the location indicator indicating the mobile communication terminal to be located within the coverage of its home network is disregarded. Instead, the location indicator indicating the mobile communication terminal to be out of its home network is considered to be valid. This allows the location to be determined even if there are only two location indicators (and thus only two location sources) even if these are inconsistent. A trivial, and incorrect solution, would be to estimate the location to a midpoint between the two indicated locations. Here, by assuming that the home location is false when an inconsistency occurs, we can with high likelihood of being correct assume that the location out of the home network.

In the store location step 68, the location, based on the location indicator indicating the mobile communication terminal to be located away from the coverage of its home network, is stored in a location database, for the mobile communication terminal in question.

In an optional store discrepancy indicator step 69, a discrepancy indicator is stored for the mobile communication terminal in the location database. This can be used in the next iteration of the method, in the verify location step 61.

A discrepancy indicator for a mobile communication terminal, in combination with a location source indicating the mobile communication terminal to be in its home network, is a strong indication to verify location.

In an optional store operator data step 54, data regarding the location sources is stored, achieving a self learning system, to better identify when discrepancies are likely in the future. For example, sometimes networks span over several countries. This can e.g. be due to a mobile communication terminal being close to a border, or an operator operating full networks in several countries, but under the same network identity. Such a situation can be detected using this method and is here stored for future use, e.g. in the determination whether to verify the location in the conditional verify location step 61.

The method, optionally after a delay, then returns to the obtain first location indicator step 60.

Stepping back in the method, when the conditional inconsistent step 64 finds no inconsistency, both location sources are considered to be valid and the method continues to the conditional discrepancy indicator step 50. In the optional conditional discrepancy indicator step 50, it is determined whether there is a discrepancy indicator stored in the location database for the mobile communication terminal. When this is the case, the method continues to the remove discrepancy indicator step 52. Otherwise the method, optionally after a delay, returns to the obtain first location indicator step 60.

In the remove discrepancy indicator step 52, there has previously been an in discrepancy for the mobile communication terminal, but this discrepancy has since been resolved. Hence, the discrepancy indicator for the mobile subscriber is removed in the location database. The method, optionally after a delay, then returns to the obtain first location indicator step 60.

Figure 4:
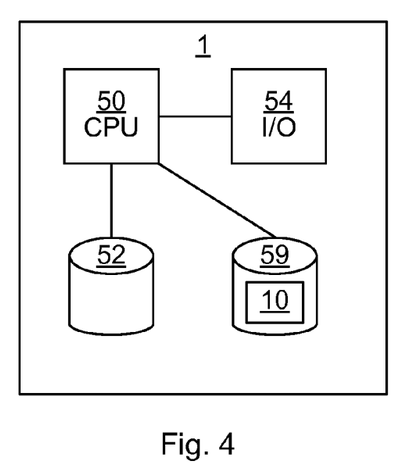
FIG. 4 is a schematic diagram illustrating some components of the location determiner of FIGS. 1 and 2.

FIG. 4 is a schematic diagram showing some components of the location determiner 1 of FIGS. 1 and 2. A processor 50 is provided using any combination of one or more of a suitable central processing unit (CPU), multiprocessor, microcontroller, digital signal processor (DSP), application specific integrated circuit etc., capable of executing software instructions contained in a computer program stored in a computer program product 52, e.g. in the form of a memory, but not in the form of a signal or any form of electromagnetic wave. The processor 50 can be configured to execute the method described with reference to FIG. 3 above.

The computer program product 52 is here a memory being any combination of read-and-write memory and read-only memory. The memory also comprises persistent storage, which, for example, can be any single one or combination of magnetic memory, optical memory, solid state memory or even remotely mounted memory. The processor 50 controls the general operation of the location determiner 1.

The location determiner 1 further comprises a data memory 59, which is a read-and-write memory. The data memory 59 may also comprises persistent storage, which, for example, can be any single one or combination of magnetic memory, optical memory, solid state memory or even remotely mounted memory. Optionally, the computer program product 54 and the data memory 59 can form part of the same memory device. The data memory contains a location database 10 which stores the location data and discrepancy indicators for mobile communication terminals as described in more detail with reference to the method of FIG. 3 above.

Figure 5:
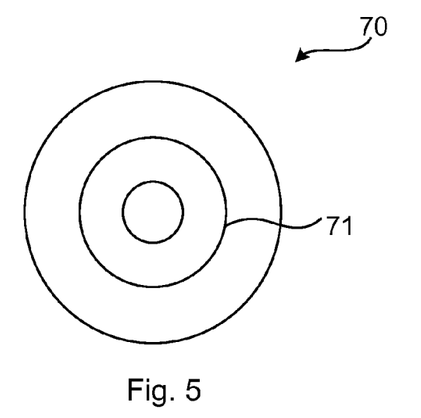
FIG. 5 shows one example of a computer program product comprising computer readable means.

The location determiner 1 further comprises an I/O interface 54 for communicating with external entities, such as location sources and location requesters. Other components of the location determiner 1 are omitted in order not to obscure the concepts presented herein FIG. 5 shows one example of a computer program product 70 comprising computer readable means. On this computer readable means, a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 7 or as a portable solid state memory (e.g. a Universal Serial Bus, USB, stick). While the computer program 71 is here schematically shown as a track on the depicted optical disk, the computer program can be stored in any way which is suitable for the computer program product.

Figure 6:
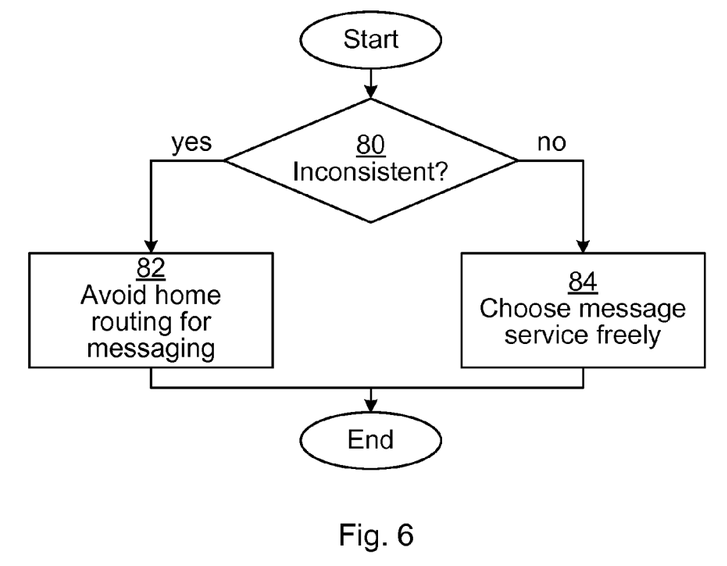
FIG. 6 is a flow chart illustrating a method according to one embodiment.

FIG. 6 is a flow chart illustrating a method according to one embodiment. The method can be performed in the location determiner of FIGS. 1 and 2 or in a separate node such as the security alert system explained above, when a message is to be sent to a particular mobile subscriber. Optionally, the method of FIG. 6 can follow after the method of FIG. 3 or the method of FIG. 6 can be performed in parallel to the method of FIG. 3.

In a conditional inconsistent step 80, it is determined whether the inconsistency is true. This can be evaluated in this step directly (e.g. as for step 64 of FIG. 3), or by checking if there is a discrepancy indicator (see step 69 of FIG. 3) stored for the mobile subscriber. If the inconsistency is true, the method continues to an avoid home routing for messaging step 82. Otherwise, the method continues to a choose message service freely step 84.

In the avoid home routing for messaging step 82, the message is sent, while avoiding sending messages via a message service associated with the location source indicating the mobile communication terminal to be located within the coverage of its home network.

In the choose message service freely step 84, the message is sent with no restriction with regard to home routing.

Using this method when sending messages, the delivery report inconsistency when home routing occurs, as explained above, is avoided.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a location of a mobile communication terminal, the method being performed in a location determiner and comprising the steps of:
obtaining, using a first location source, a first location indicator of the mobile communication terminal by obtaining from the first location source, SMS, Short Message Service, routing information indicating a current network of a mobile subscriber; and deriving the first location indicator using the current network;
obtaining, using a second location source, a second location indicator of the mobile communication terminal by obtaining, from the second location source, SMS routing information indicating a current network of a mobile subscriber; and deriving the second location indicator using the current network;
determining an inconsistency condition to be true when one, and only one, of the first and second location indicators indicates the mobile communication terminal to be located within the coverage of its home network; and
when the inconsistency condition is true, disregarding the location indicator indicating the mobile communication terminal to be located within the coverage of its home network.

2. The method according to claim 1, further comprising the step of:
when the inconsistency condition is true, storing for the mobile communication terminal, in a location database, a location based on the location indicator indicating the mobile communication terminal to be located away from the coverage of its home network.

3. The method according to claim 1, further comprising the step of:
when the inconsistency condition is true, storing a discrepancy indicator for the mobile communication terminal in the location database.

4. The method according to claim 3, wherein the method is repeated and further comprises the step of:
when the first location indicator is consistent with the second location indicator and there is a discrepancy indicator stored for the mobile subscriber, removing the discrepancy indicator for the mobile subscriber in the location database.

5. The method according to claim 3, further comprising the step of:
when there is a discrepancy indicator stored for the mobile subscriber, avoiding sending messages via a message service associated with the location source indicating the mobile communication terminal to be located within the coverage of its home network.

6. The method according to claim 1, further comprising the step of:
when the inconsistency condition is true, avoiding sending messages via a message service associated with the location source indicating the mobile communication terminal to be located within the coverage of its home network.

7. The location determiner according to claim 6, wherein the instructions are repeated and wherein the instructions to obtain the second location indicator is only performed for a minority of iterations.

8. The location determiner according to claim 6, further comprising instructions to store operator data when it is determined that an operator operates a cellular communication network with an identical network identifier in more than one country.

9. The method according to claim 1, wherein the method is repeated, and wherein the step of obtaining the second location indicator is only performed for a minority of iterations.

10. The method according to claim 1, further comprising the step of:
storing operator data when it is determined that an operator operates a cellular communication network with an identical network identifier in more than one country.

11. A location determiner for determining a location of a mobile communication terminal, the location determiner comprising:
a processor; and
a computer program product storing instructions that, when executed by the processor, causes the location determiner to:
obtain, using a first location source, a first location indicator of the mobile communication terminal by obtaining from the first location source, SMS, Short Message Service, routing information indicating a current network of a mobile subscriber; and deriving the first location indicator using the current network;

obtain, using a second location source, a second location indicator of the mobile communication terminal by obtaining, from the second location source, SMS routing information indicating a current network of a mobile subscriber; and deriving the second location indicator using the current network;

determine an inconsistency condition to be true when one, and only one, of the first and second location indicators indicates the mobile communication terminal to be located within the coverage of its home network; and when the inconsistency condition is true, disregard the location indicator indicating the mobile communication terminal to be located within the coverage of its home network.

12. The location determiner according to claim 11, wherein the computer program product further comprises instructions to:

when the inconsistency condition is true, store for the mobile communication terminal, in a location database, a location based on the location indicator indicating the mobile communication terminal to be located away from the coverage of its home network.

13. The location determiner according to claim 11, wherein the computer program product further comprises instructions to: when the inconsistency condition is true, store a discrepancy indicator for the mobile communication terminal in the location database.

14. The location determiner according to claim 13, wherein the computer program product further comprises instructions to:

avoid sending messages via a message service associated with the location source indicating the mobile communication terminal to be located within the coverage of its home network when there is a discrepancy indicator stored for the mobile subscriber.

15. The location determiner according to claim 11, wherein the instructions are repeated; and the computer program product further comprises instructions to:

when the first location indicator is consistent with the second location indicator and there is a discrepancy indicator stored for the mobile subscriber, remove the discrepancy indicator for the mobile subscriber in the location database.

16. The location determiner according to claim 11, wherein the computer program product further comprises instructions to:

avoid sending messages via a message service associated with the location source indicating the mobile communication terminal to be located within the coverage of its home network when the inconsistency indicator is true.

17. A computer program comprising a non-transitory computer readable medium for determining a location of a mobile communication terminal, the computer program comprising computer program code which, when run on a location determiner, causes the location determiner to:

obtain, using a first location source, a first location indicator of the mobile communication terminal by obtaining from the first location source, SMS, Short Message Service, routing information indicating a current network of a mobile subscriber; and deriving the first location indicator using the current network;

obtain, using a second location source, a second location indicator of the mobile communication terminal by obtaining, from the second location source, SMS routing information indicating a current network of a mobile subscriber; and deriving the second location indicator using the current network;

determine an inconsistency condition to be true when one, and only one, of the first and second location indicators indicates the mobile communication terminal to be located within the coverage of its home network; and when the inconsistency condition is true, disregard the location indicator indicating the mobile communication terminal to be located within the coverage of its home network.

18. The computer program product comprising a non-transitory computer readable medium for storing computer program according to claim 17 and a non-transitory computer readable means on which the computer program is stored.

* * * * *